(12) United States Patent
Platzker et al.

(10) Patent No.: US 6,388,654 B1
(45) Date of Patent: *May 14, 2002

(54) METHOD AND APPARATUS FOR PROCESSING, DISPLAYING AND COMMUNICATING IMAGES

(75) Inventors: Daniel M. Platzker, Saratoga, CA (US); Tsakhi Segal, Tel-Aviv (IL); Liel Biran, Kfar Saba (IL); Gilad Halevy, Jerusalem (IL)

(73) Assignee: Tegrity, Inc. (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/166,211

(22) Filed: Oct. 2, 1998

Related U.S. Application Data

(60) Provisional application No. 60/060,942, filed on Oct. 3, 1997.

(51) Int. Cl.[7] ................................................. G09G 5/00
(52) U.S. Cl. ............................. 345/156; 345/1.2; 345/9
(58) Field of Search ................................. 345/156, 157, 345/158, 169, 7, 8, 9, 180, 179, 181, 182, 173, 1.1, 1.2, 2.1, 2.2

(56) References Cited

U.S. PATENT DOCUMENTS

| | | | | |
|---|---|---|---|---|
| 3,885,096 A | * | 5/1975 | Inuiya | 345/180 |
| 5,115,230 A | * | 5/1992 | Smoot | 345/9 |
| 5,181,181 A | * | 1/1993 | Marshall et al. | 345/158 |
| 5,368,309 A | * | 11/1994 | Monroe et al. | 345/9 |
| 5,781,174 A | * | 7/1998 | Uya et al. | 345/2 |
| 5,936,615 A | * | 8/1999 | Waters | 345/173 |

OTHER PUBLICATIONS

Advertizing Materials of Tegrity, Ltd. "Tegrity Digital Flipchart for Microsoft Office".

\* cited by examiner

*Primary Examiner*—Xiao Wu
(74) *Attorney, Agent, or Firm*—Goodwin Procter LLP

(57) ABSTRACT

The application discloses an apparatus and method of processing images, hand-drawn or written on a suitable Writing Surface, viewed by an Image Sensor such as a video camera, and captured by an image sensing circuit (i.e., frame grabber or similar) used for acquisition of image frames by a computer. More particularly, this invention discriminates among changes detected in these Viewed Images in order to identify and disregard non-informational, transient and/or redundant content. Removal of such content, a writer's arm for example, from the captured image facilitates isolating meaningful changes, specifically intentional new Writings and Erasures appearing on the Writing Surface. Preserving only meaningful changes on the surface promotes optimized: "video image" storage and compressed transmission of a subset of the visual data, when used in conjunction with digital computers at remote locations optionally equipped with projected image and/or conventional computer display systems. The invention provides for displaying a composite of the remote sites' changes, transmitted over conventional communications channels, omitting Local Markings where the display device is a projector. The preferred embodiment of the present invention is applied to remote presentation aids, in particular "whiteboards" such as those typically used in educational lectures and commercial sales and training settings, and in particular to remote whiteboards. As will become clear, however, the application of the present invention is not restricted to whiteboards exclusively, but can work with any Writing Surface suitable for image acquisition (e.g., flipcharts or paper on a desk). Receive-only sites may participate in the remote presentation without contributing Local Markings to the composite. The present invention is compatible with conventional software products which will carry audio and other data streams on the same channel as the compressed image signals.

20 Claims, 6 Drawing Sheets

METHOD AND APPARATUS FOR PROCESSING, DISPLAYING AND COMMUNICATING IMAGES

CROSS-REFERENCE TO RELATED APPLICATION

This is an application pursuant to a provisional application under the title "Remote Virtual Whiteboard," filed Oct. 3, 1997 and assigned Ser. No. 60/060,942.

FIELD OF THE INVENTION

The present invention relates generally to the field of processing images, and more particularly, to the field of remote conferencing applications.

INCORPORATION BY REFERENCE

This application incorporates by reference the "Interactive Projected Video Image Display System" disclosed under U.S. Pat. No. 5,528,263 (Platzker et al.) as if set forth at length herein.

Definitions

Background Image A computer-generated template, often from another active application (such as Microsoft® PowerPoint®[1]), incorporated into the Computer Display Image.

[1] Microsoft and PowerPoint are registered trademarks of Microsoft Corporation.

A Committed Image A composite of the Background Image and all Writing Images to be saved into some suitable medium, such as storage component, transmission channel, or to a compatible software application.

Computer Display Image The display presented by a computer for human viewing on a device such as a monitor or Projection Surface employing technologies such as VGA, SVGA, XGA and others.

Image Sensor An optical device such as a video camera, digital camera or other imaging technology capable of viewing a Writing Surface with Local Markings.

Local Markings Markings ("Local Writings" and/or "Local Erasures") made on the Writing Surface of the site of reference.

Local Updates Stream of data packets containing compressed representations of changes made to Local Markings.

Markings Writings and annotations (collectively, "Writings") and/or deletions ("Erasures") made by a human presenter on a Writing Surface.

Projection Surface A surface upon which the Computer Display Image created by a computer-controlled projection may appear; in the present invention, this will substantially overlap the Writing Surface.

Projections Visual information that appears in the Viewed Image as a result of projecting the Computer Display Image onto the Writing Surface (distinguished from Markings and Viewed Image Interference); in the context of the present invention Projections are relevant insomuch as they appear similar to physical Markings or otherwise complicate the task of detecting and processing Markings.

Remote Markings Markings ("Remote Writings" and/or "Remote Erasures") made on the Writing Surfaces of non-local sites.

Remote Updates Stream of data packets containing compressed representations of changes made to Remote Markings.

Stored Viewed Image The most recent Viewed Image modified to exclude Viewed Image Interference and retained for purposes of detecting changes to Local Markings in a comparison with a Viewed Image.

Stored Writing Image The most recent Writing Image retained for purposes of encoding Local Updates in a comparison with an updated Writing Image.

Viewed Image The image acquired (or "seen") by the Image Sensor and made available as digital information to computational resources (software/hardware).

Viewed Image Interference Physical objects that are interposed between the Image Sensor and the Writing Surface and therefore appear in the Viewed Image, for example, a writer's arm or body (distinguished from Markings and Projections).

Warping A transformation performed on an image based on a mapping between two geometrical coordinate spaces; in the present invention Viewed Images (or portions thereof) are transformed in this manner to a predefined display coordinate space and projected images (or portions thereof) are transformed to the coordinate space of the Viewed Images (using both Warping and optional "scaling" to overcome differences in pixel-resolution); the geometric mapping is obtained through a process of calibration.

Writing Images Internal representations of the Local Markings or Remote Markings at any point in time, one Writing Image per participating transmitting site.

Writing Surface Any surface suitable for human writing, such as a whiteboard, paper flip-chart or sheets of paper; in the present invention, this will also be the Projection Surface, if employed.

BACKGROUND OF THE INVENTION

Business, academic and other professional meetings are held to impart information to, and solicit ideas from, the attendees. The convener of a meeting usually seeks participation from the attendees, and it is an effective use of expensive meeting time to capture and record the key thoughts and ideas of the presenters and participants for future reference. It is particularly effective to record and display key points, numbers, etc., dynamically as these are forthcoming from participants at a meeting or seminar. An issue is how to record and display this information most effectively with minimal distraction. The transcription by hand of information written on a vertical board is known to every school child.

Such data are ephemeral, however, and must eventually be erased. Traditionally, each participant takes his or her own notes, each copying essentially the same material. Paradoxically, valuable information may be missed by one or several or many of participants because of the diversion of their attention to note-taking, and there may be errors in the transcription.

One approach to solving this problem is disclosed in the U.S. Pat. No. 5,528,263 previously incorporated hereinabove by reference, the "Interactive Projected Video Image Display System." In this patent beginning at column 6, line 60 a function is described to enable a computer to capture updated images. This system has been commercialized as Digital Flipchart™ ("DFC"). The system disclosed in the Platzker et al. patent and the one commercialized by Tegrity can be used at only one location and cannot capture an updated image without blanking the screen and cannot ignore transient objects in the field of view.

Video technology could solve the problem and limitations of the prior art, but would increase the cost and complexity of linking remote sites. Linking remote sites would allow remote participants to view written information from other sites in real-time. Using video technology to this end, the presenter must be careful not to block the view unduly, adding an unnatural constraint to a presentation. On the remote end, video images of a person's arm, blouse or tie are unnatural, unsatisfactory, uninformative, distracting at best and, at worst, an annoyance that detracts from the value of the presentation to remote viewers. Moreover, such useless video data further burdens the transmission channel. Combining video images from dispersed locations adds even more complexity.

Transmitting even compressed video uses substantial bandwidth. Transmitting compressed video of images containing motion uses even more bandwidth.

SUMMARY OF THE INVENTION

The present invention is an apparatus and method for providing a composite image on a standard whiteboard, flipchart or other Writing Surface's location at a first site, consisting of Local Markings and a projection of only the meaningful changes (i.e., Writings and Erasures) made to at least a second Writing Surface located at a second site. The result is an appearance on the local Projection Surface of a combination of physical Local Markings together with a projection of the remote sites' respective Markings. Thus, the same composite image appears on the Projection Surface at every site, although local viewers see the actual physical Markings made locally, as opposed to the projected Remote Markings. To human perception, everyone at every connected site is seeing the "same" image, differing only in size and to the degree imposed by the technical capabilities of the local projector. The composite image also incorporates the Background Image if one is generated within the computer.

In general, each site may utilize an Image Sensor connected to a standard PC-type processor. The process, when employed in such a site, continuously "looks" (i.e., grabs Viewed Images via the Image Sensor) at the present composition of the Writing Surface. It also continuously monitors the present composition of the Computer Display Image, if it is projected on the Writing Surface. These image are analyzed to detect the existence and precise locations of three kinds of information:

1. Viewed Image Interference—these areas are detected, ignored and therefore not encoded or transmitted and no bandwidth is consumed by them.
2. Projected "writings"— information that represents projected "objects" sensed by the Image Sensor (e.g., Writings from other stations which are projected by a projector). These Projections are similarly detected, ignored and withheld from transmission.
3. Local changes—changes to Local Markings which appeared after the previous analysis. These local changes are processed. Remote sites (if any) may utilize a different display resolution (the number of pixels in the VGA). Local changes undergo a process of geometric adaptation (Warping), which transforms them to a common display resolution. The local changes are then encoded in a compressed format as Local Updates and sent to other, remote sites for display (with optional buffering of the transmitted data), and/or appended to a stored data stream. The result of the process is that each site displays the Writings of all other parties. This display may be projected on the same physical Projection Surface upon which Local Markings are written. Consequently, all of the displays at each interconnected site contain all of the information recorded elsewhere. Local Writings (i.e., locally recorded notations) are not displayed (or projected). Users have a "commit capture" option whereby the resulting composite Committed Image of the Writings from all sites may be saved. There may also be "receiver" only stations, i.e., sites which do not transmit Local Updates, if any, and need not be equipped with an Image Sensor or a Writing Surface. These sites merge and display Markings received from other physical sites. Optionally, such sites can be made to operate using standard, widely available Internet browsing software without the need for additional, special-purpose hardware or software components.

In an optional embodiment, a remote site can be configured as display-only. The composite image for display or projection at such a display-only (or receive-only) site would consist of the assembled, ongoing changes to Remote Markings and Background Image without any physical Local Markings comprising part of the image.

The remote conferencing capabilities of the invention are facilitated by the innovation of a method of using a computer to isolate changes to Markings, filtering out transient data, and compressing the result for transmission and/or storage. The computer processes the Viewed Image signals, or "frames," representing the images appearing in the viewing field of the local Image Sensor indicative of Markings made on the local Writing Surface. The meaningful portion of this continuous sequence of frames are those not indicative of the presence of Viewed Image Interference, should any appear transiently in the local viewing field, or of Projections. The method detects changes between successive frames. These frames are filtered to reject those signals below a predetermined spatial frequency representing obstructions, and the successive, filtered frames are further examined to detect changes indicative of the Writings or Erasures made on the local Writing Surface as distinguished from transient changes characteristic of Viewed Image Interference. These changes are further examined to eliminate those that are caused by changes to the Projections, if the Computer Display Image is projected. The result is a compressed representation of changes to Markings, suitable for decompression and display at the receiving end. As such, the method may be termed a "writing codec."

Representations of the successive changes may be stored for later playback, locally or remotely. In one embodiment, an image may be transmitted from time to time even without changes to permit a late joining site or one which is restarting to develop a composite image.

DESCRIPTION OF THE DRAWINGS

The present invention is more readily understandable by reference to the following detailed description read in pari materia with the accompanying drawings in which.

DETAILED DESCRIPTION OF THE PREFERRED EMBODIMENT OF THE INVENTION

Figure 1:
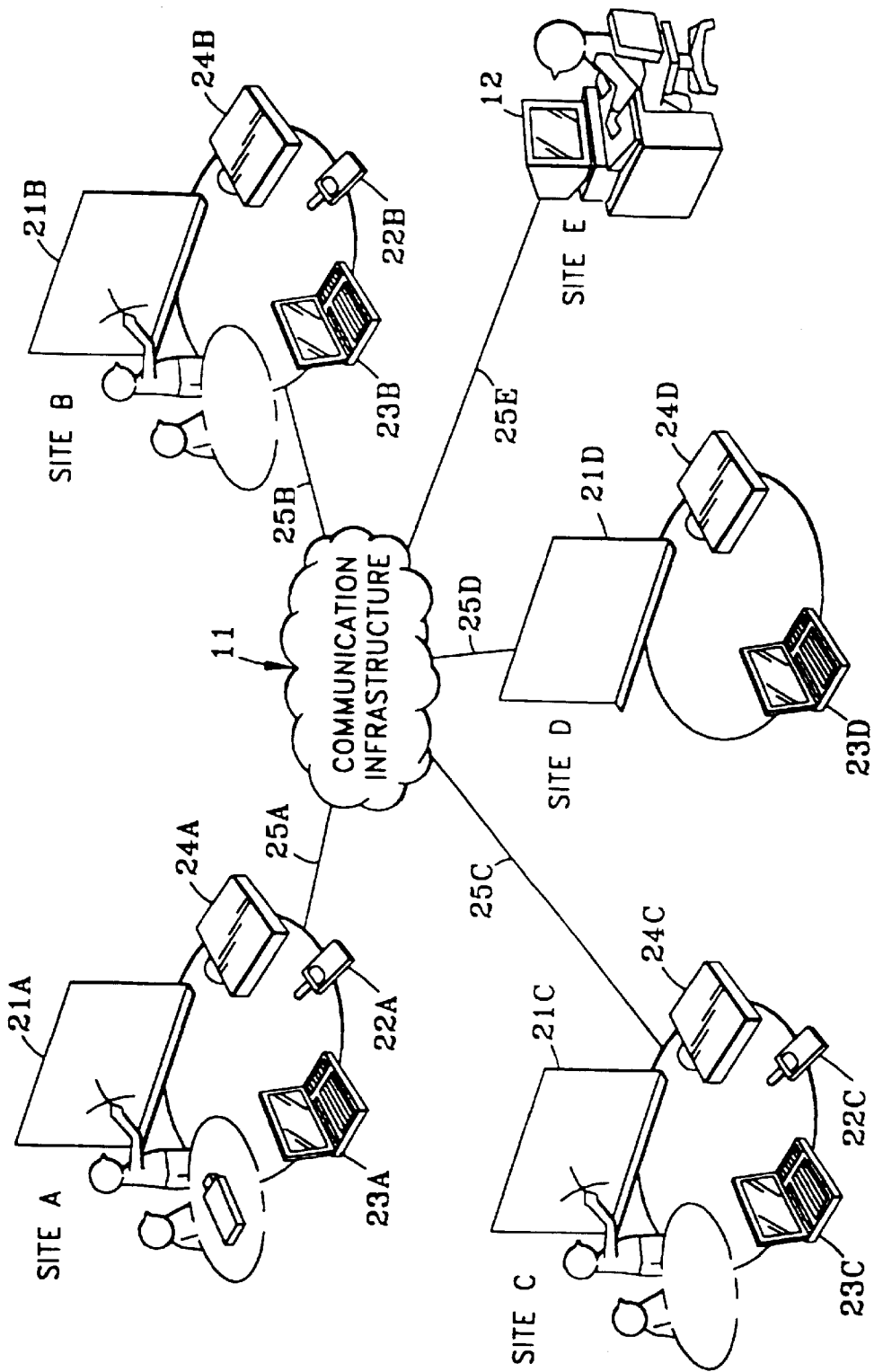
FIG. 1 is an example of variously configured, interconnected transmit-and-receive and receive-only sites utilizing the image processing capabilities of the present invention.

Referring now to FIG. 1, there is a drawing depicting a plurality of image processing sites (A through E), interconnected by a communication infrastructure [11]. Five sites are shown. Sites A, B and C each have two independent operating modes: Transmit and Receive. These sites are sources of transmitted images because each is equipped with an Image Sensor [22] to view the Markings on their respective Writing/Projection Surfaces [21]. Each such site A, B and C can operate in either Receive mode, Transmit mode or both simultaneously, and may be referred to for convenience as "transmit-and-receive" sites. The other two sites, D and E, are not equipped with image-sensing devices and thus operate in Receive mode only ("receive-only" sites). In the event that Markings are made upon the Projection Surface [21D] at site D, these Markings will not be input, processed or transmitted to any other site. All sites may be linked by virtually any type of data communication infrastructure [11], for example, via modem, local area network ("LAN"), Internet or other types of communications channel.

Figure 2A:
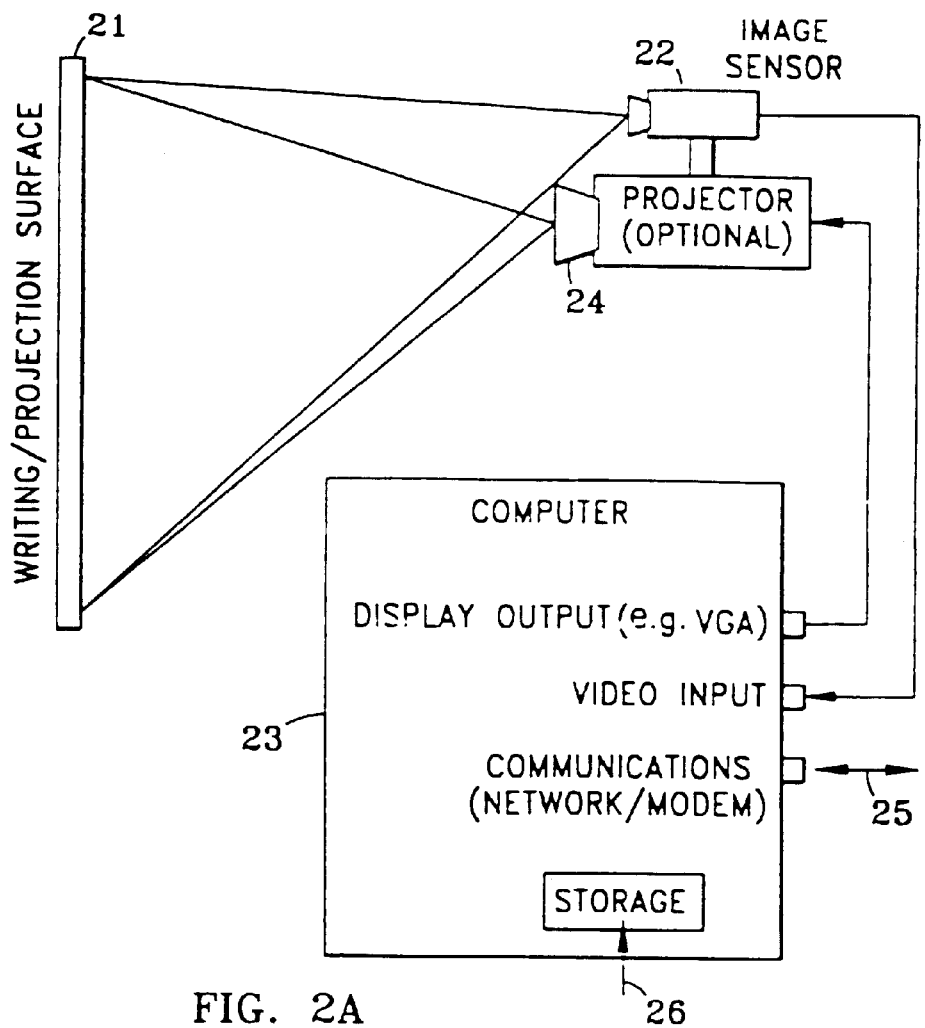
FIG. 2A is a model of a typical configuration depicting transmit-and-receive site that operates in accordance with the present invention.
Figure 2B:
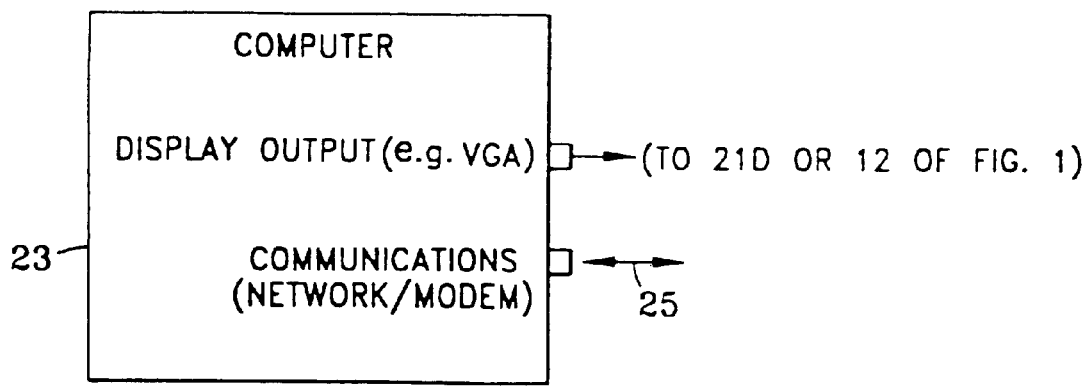
FIG. 2B is a model of a typical configuration depicting the required components for a receive-only site that operates in accordance with the present invention.

FIGS. 2A and 2B depict in more detail the typical site configurations for transmit-and-receive and receive-only implementations of the present invention. FIG. 2A shows the major components required for using Transmit and Receive mode. The site in FIG. 2A has an Image Sensor [22] to capture images of a local Writing Surface [21] continuously into a computer [23]. A projector [24] projects the computer generated Computer Display Image onto the Writing Surface [21]. A person can also write and erase Markings on the Writing Surface [21] interspersed with the projected image.

FIG. 2B depicts a configuration for receive-only sites D and E, without the optional Image Sensor [22] and corresponding video input circuit in computer [23] required at transmit-and-receive sites A, B and C. A receive-only site may be configured the same as a transmit-and-receive site, but in that event these devices will not be utilized by the present invention. At a receive-only site, the display output may be directed to a projector-type device or a typical computer monitor (such as [21D] and [12] depicted in FIG. 1 at sites D and E, respectively).

In each instance of a transmit-and-receive (FIG. 2A) and receive-only site (FIG. 2B), the computer [23] is connected to a communications channel [25]. In another embodiment of the present invention (not depicted), the session may be played back from remote storage device via the communications channel [25]. In addition, another embodiment provides for the playback of a session from a local data storage device [26], in which case the communications link [25] would not be required.

Figure 3:
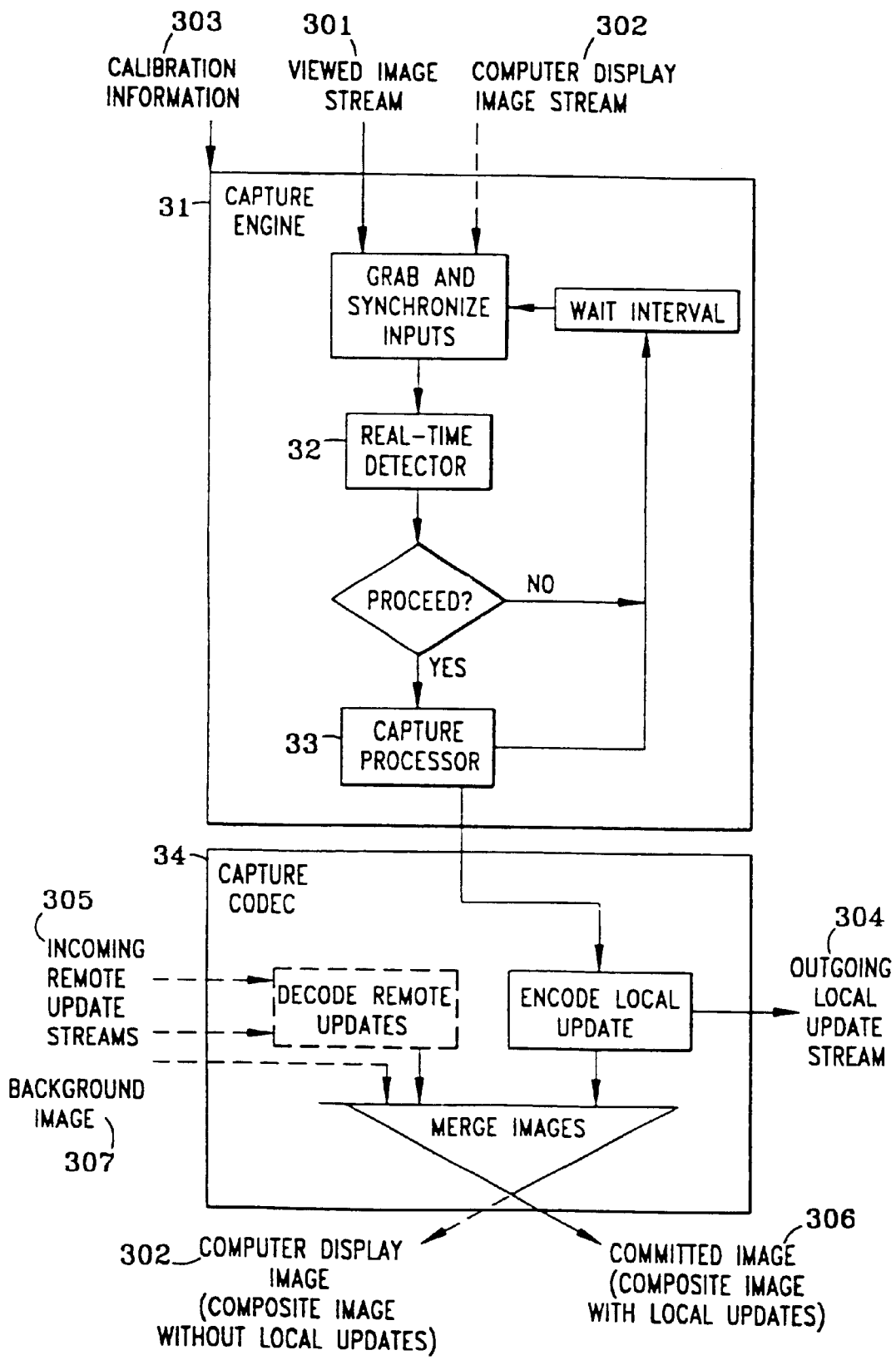
FIG. 3 is a high-level flowchart of the preferred embodiment of the method of the image processing of the present invention.

FIG. 3 is a flow diagram of the major components of the method whereby the various raw and processed images deriving from local and remote sources, are manipulated in accordance with the teachings of the preferred embodiment of this invention. The implementation of the preferred embodiment is accomplished in software, resident and operating in the computer device [23] depicted in FIGS. 1, 2A and 2B. A receive-only site (FIG. 2B and sites D and E in FIG. 1) requires neither the functionality of the "capture engine" [31], as the local inputs shown as [301], [302] and [303] would not be present, nor of the "Encode local update" subprocess of the "capture codec"[34], as there would be no local data incoming from [31] for it to process. Accordingly, in one embodiment of the present invention, these functions may be omitted in receive-only implementations.

Figure 4A:
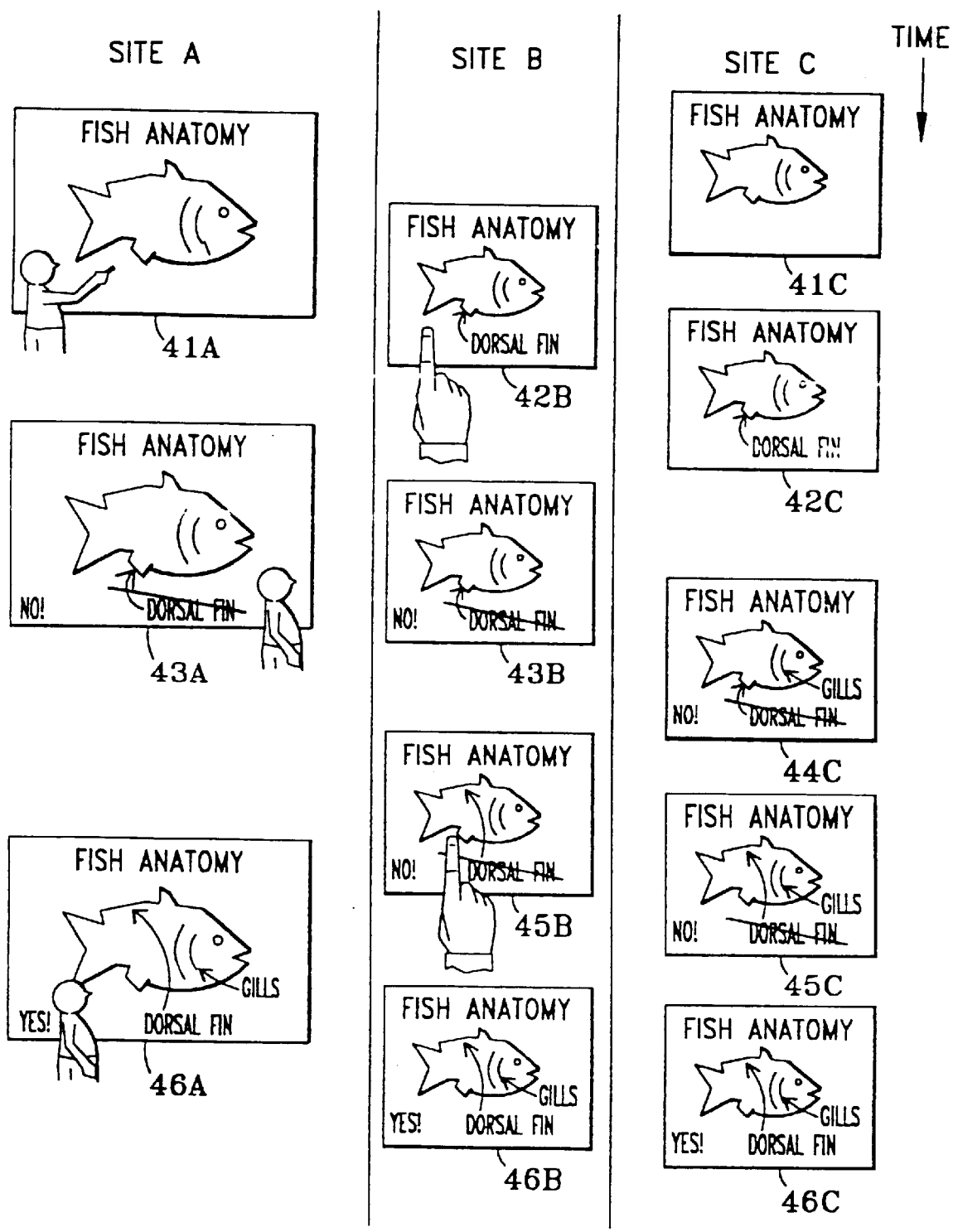
FIG. 4A is a representation of a Writing Surface appearance throughout the progression of a hypothetical session as perceived by a human observer in multiple, interconnected transmit-and-receive sites A, B and C, each of which are equipped with Image Sensors.
Figure 4B:
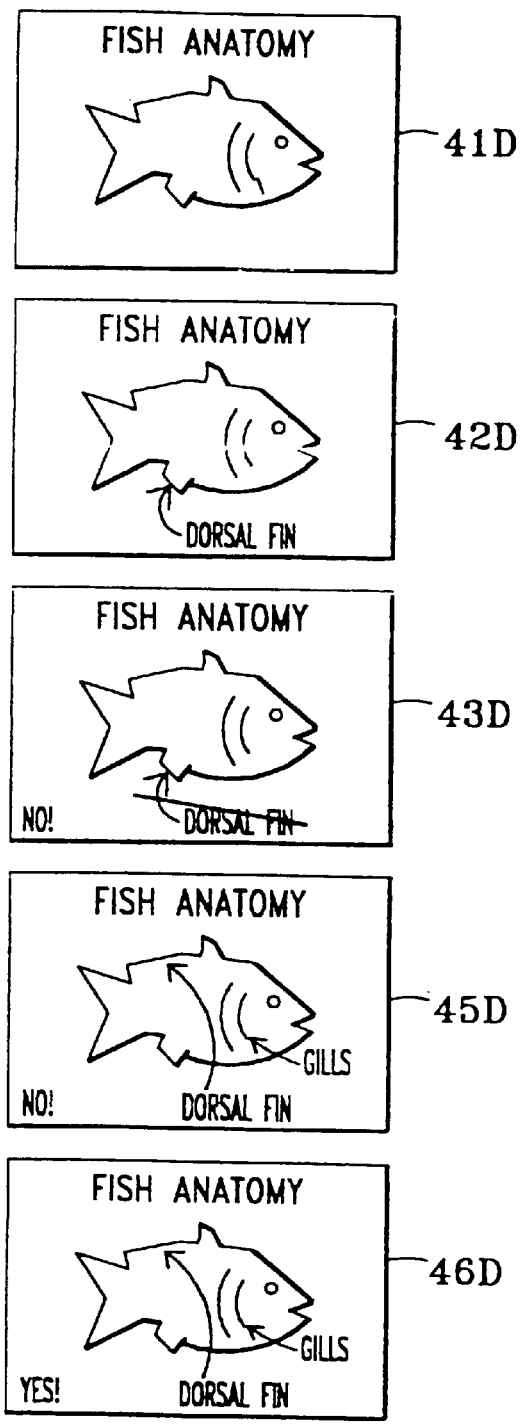
FIG. 4B is a representation of the progression of the composite Computer Display Image of the same hypothetical session of FIG. 4A as displayed at receive-only sites D (with projector-type display device) and E (with computer monitor-type display device).
Figure 4B:
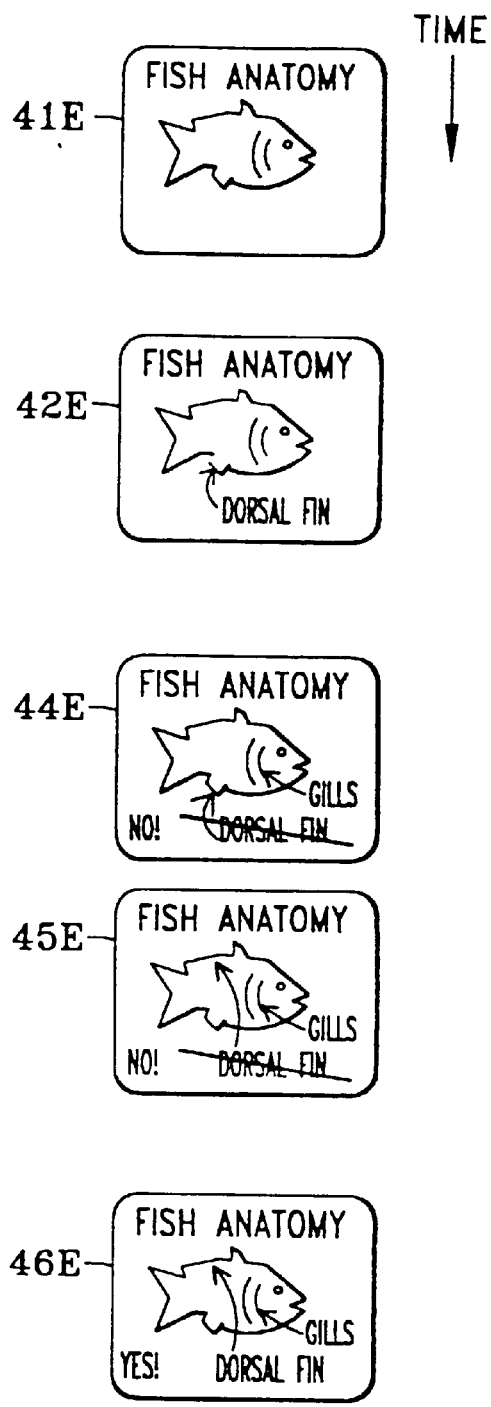

FIGS. 4A and 4B are illustrative examples of a sequence of illustrations that represent human perception of the Writing Surfaces of sites A, B and C (shown in FIG. 1 as [21A] through [21C]), as well as the Projection Surface [21D] of site D and monitor [12] of site E, as a result of using the computers at each site ([23] of FIGS. 1, 2A and 2B) to execute the process of the present invention (diagramed in FIG. 3). The diagram of FIG. 4A shows successive "snapshots" in time of the three remote transmit-and-receive sites A, B and C of FIG. 1. Each frame depicts a point in time where there has been detected a meaningful change to the Markings on at least one of the transmit-and-receive sites' Writing Surfaces. Each frame is numbered from [41] through [46], inclusive, in ascending time sequence, with a suffix representing the site. Frames labeled with the same integer but a differing suffix (e.g., [41A] and [41C]) depict the simultaneous appearance of the Writing and/or display Surfaces at the respective sites.

For purposes of illustration, the rectangular frames represent the periphery of the Writing Surfaces at transmit-and-receive sites A, B and C ([21] in FIGS. 1 and 2A) upon which the Image Sensors should be trained. In the case of the receive-only site D, the rectangle represents the periphery of the Projection Surface ([21D] in FIG. 1); at site E, the shadowed frame represents the edge (or, outermost pixels) of the monitor ([12] in FIG. 1).

Further with respect to FIG. 4A, certain figures are superimposed upon these rectangles: a stylized person moving in front of the illustrations at time sequences [41A], [43A] and [46A], and a hand with the index finger extended at time sequences [42B] and [45B]. These superimposed figures represent undesirable, transient obstructions (Viewed Image Interference) in the fields of view of the Image Sensors [22A] and [22B] at sites A and B, respectively. Images of obstructions processed by the computers [23] at sites A and B are removed by the execution of the process diagramed in FIG. 3 and, therefore, are not transmitted over the communications channels [25] and do not appear on the displays/surfaces illustrated at any other site.

FIG. 4B depicts the resulting overall composite image which would be displayed at receive-only sites. Each sequence would appear on the Projection Surface (shown as [21D] in FIG. 1) at site D and upon the monitor display ([12] in FIG. 1) at site E. The composite image appearing at any receive-only site would be the same, except for any geometrical adjustment such as for resolution or scale. These geometrical adjustments are performed locally. Thus the displays appearing on [21D] and [12] at receive-only sites D and E, respectively, are themselves composites replicating all of the Local Markings of all transmit-and-receive sites A, B and C. It is possible that receive-only site D may use a whiteboard (or other Writing Surface) as its Projection Surface [21D]. In the event that any Local Markings happen to be made at site D upon that Projection Surface [21D], these Markings will not be detected or processed in Receive-mode, and will not be incorporated in the overall composite image. In other words, if Local Markings are made at receive-only site D, these Markings do not appear at any other site because site D does not operate in transmit mode.

Figure 5:
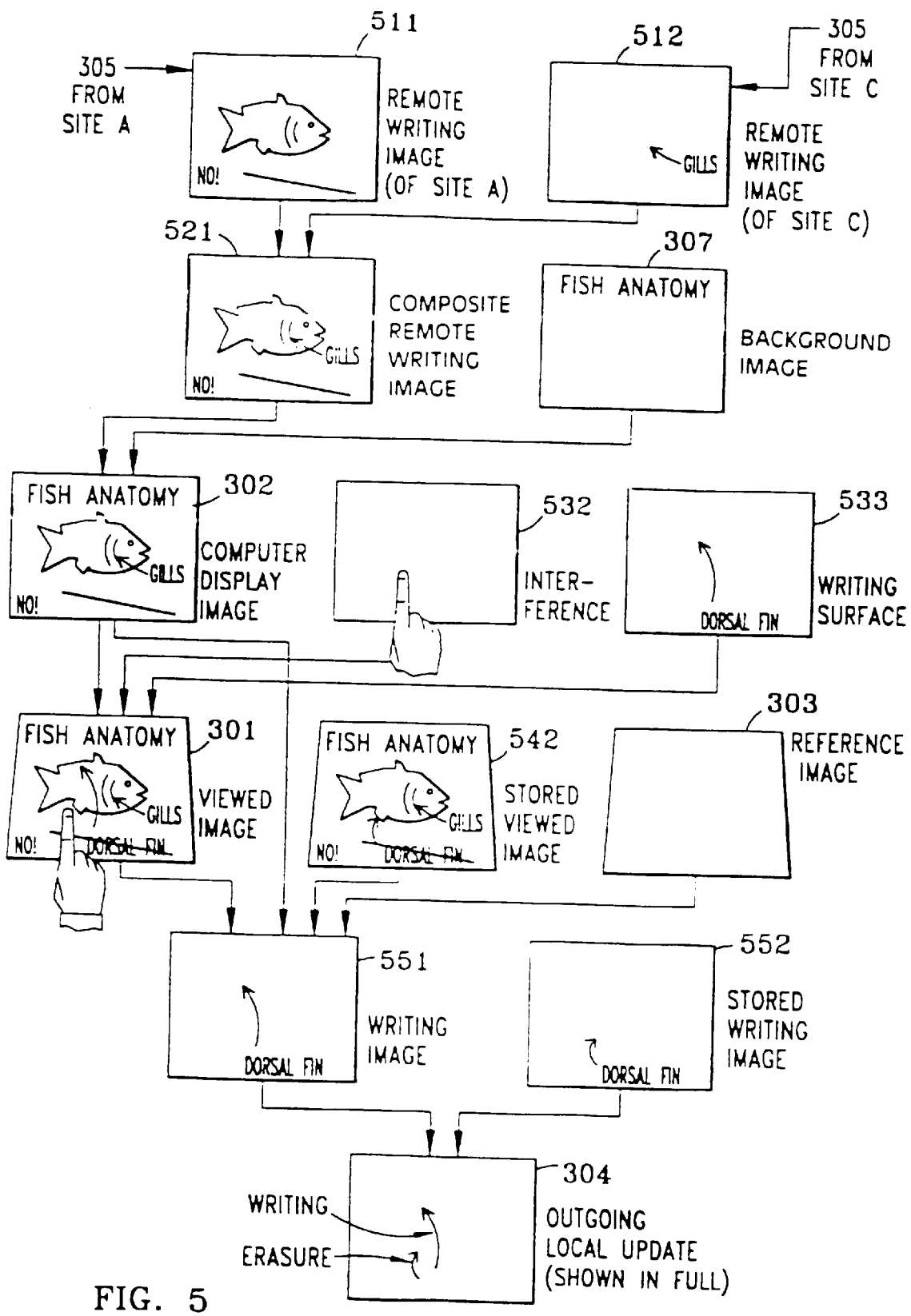
FIG. 5 is a detailed depiction of the process by which one of the Local Updates represented in FIG. 4A at transmit-and-receive site B is readied for transmission and/or storage.

FIG. 5 further illustrates the result of the process of FIG. 3, performed by the computer [23]. In particular, FIG. 5 details the process whereby transmit-and-receive site B produces the Local Update that corresponds to the change shown in FIG. 4A from time sequence [44] (illustrated at transmit-and-receive site C as [44C]) to time sequence [45] (depicted in FIG. 4A at transmit-and-receive sites B and C as [45B] and [45C], respectively).

In accordance with the present invention, there is no inherent restriction on the number of sites which may participate in a real-time session. External constraints such as limitations of computer memory or processing or channel capacity may make an arbitrary limitation on the number of participating sites desirable. There must be at least one site operating in Transmit mode, except in the instance of a session being played back from a storage device [26].

In another embodiment of the present invention, not herein depicted, there need not be any sites operating in Receive mode, where the session is being recorded to storage [26] for the purpose of later playback. In such an embodiment, the communications channel [25] is not required. In a variant of this embodiment, the ongoing changes to the Writing Image need not be recorded to storage [26] continuously as Local Markings are made, but may be committed to storage [26] and/or be displayed [12] or projected [24] intermittently upon demand, as with capture function of the DFC product previously described. Advantages of such an embodiment over the DFC implementation include avoidance of the blanking of the Computer Display Image, more immediate availability of the Committed Image, and additional accuracy inherent in monitoring the progression of Local Markings over time.

In still another embodiment of the present invention, also not depicted, any of the transmit-and-receive sites A, B and C of FIG. 1 could be operated in Transmit mode alone. Such a site would be deemed to be a transmit-only site, without the capability of receiving and displaying Remote Updates. A projector [24] would be optional, depending upon whether the projection of a Background Image is desired. In yet another embodiment, a transmit-and-receive or transmit-only site could operate without a projector [24].

In operation, certain preliminary steps must be performed in order to effect the teachings of the invention. This disclosure assumes that projection devices [24] at any site have been properly focused upon a Projection Surface [21]. Where the projection device is also the Writing Surface at a transmit-and-receive site ([21A], [21B] and [21C]), it is required that the field of view of the site's Image Sensor [22] be trained upon, and approximately aligned with, the periphery of its Projection Surface [21]. It is advisable to have the Image Sensor [22] and projector [24] in the closest proximity practicable.

To accomplish these, the Image Sensor should be optimally focused at each site. The focusing of projection and Image Sensors is well known, and is usually performed manually to the user's satisfaction, or performed automatically if that capability is available in the specific model of the local equipment being used.

In addition, the image on the Projection Surface [21] as seen by the Image Sensor [22] must be closely aligned with the image being displayed by the projector [24] upon the same Projection Surface [21]. The present invention employs a proprietary technique used by Tegrity's DFC product, wherein the user performs a manual alignment of the Image Sensor [22] and projector [24]. This alignment step involves using the computer [23] to output to the local projector [24] an image of a rectangular test pattern for display upon the Projection Surface [21]. This test pattern contains an inner rectangle within which appears the unedited Viewed Image seen simultaneously by the Image Sensor [22] (scaled down to fit the size of the rectangle). In other words, the projected test pattern contains a projection of what the Image Sensor [22] "sees." The user then physically adjusts the orientation and focus of the Image Sensor [22] until a full replica of the projected test pattern appears within the inner rectangle, at which point the alignment is sufficient to perform the process of the present invention. This technique is known in the prior art.

Once aligned, the system must be calibrated in order to quantify characteristics of the Viewed Image seen by the Image Sensor [22]. Calibration is necessary because distortions are inevitably introduced by the optics of the Image Sensor [22] and projector [24] (e.g., by lenses) and a parallax effect caused by the distance between the Image Sensor [22] and projector [24] and/or the angle of projection and/or a non-plumbed Writing Surface [21], or some combination of these.

Calibration information [303] may be required as input to allow comparison between images captured during a session to one or more "reference" images and for adjusting environment-dependent system parameters. Reference images may be captured before the session starts or at some other time when the system can assume a controlled environment (e.g., the Writing Surface is assumed to be clear). System parameters may include information about focus, color-balance and other characteristics of the input images, as well as information about the computer display—such as its pixel resolution. When projection is employed, the calibration information also includes means of computationally transforming pixel coordinates between the coordinate space of the projected image (Computer Display Image) and that of the Viewed Image. This transformation may combine "scaling" between different pixel resolutions and Warping, which compensates for the geometric distortions described above.

The calibration algorithm may be implemented by projecting predetermined images that include features with known locations, scale dimensions and color or light intensities, capturing Viewed Images and processing them to locate and/or analyze the appearance of the predetermined features. The location of projected targets can be used as inputs to calculate the computational parameters of the Warping transformation described above. Techniques for locating projected targets, analyzing them to extract basic characteristics and computing Warping transformations based on their locations in the Viewed Image are well documented in image-processing literature.

When projection [24] is not employed, reference images may nonetheless be captured, saved and analyzed to produce the system parameters. Optionally, the user may be instructed to aid in this process, for example by aiming the Image Sensor [24], clearing the Writing Surface [24] and removing Viewed Image Interference (e.g., stepping aside). Calculating a Warping transformation may be accomplished without projection (although it is not necessarily required in this case) by instructing the user to, for example, mark corners of the writing area or to manipulate an image displayed on the computer monitor (e.g., by drawing a polygon that bounds the writing area as seen in a Viewed Image shown to the user).

The calibration procedure may contain self-checks that determine whether the system is properly aligned and capable of performing its intended functions. The user can be notified when problems are detected and what the probable nature of these problems is. For example, a focus-check determines if the Viewed Image has sufficient acuity and requests the user to adjust the focus if the test fails. As another example, if there are excessive Markings or Viewed Image Interference in the captured reference images, the user may be reminded to clear the Writing Surface and remove obstructions. These techniques are known in the prior art.

The preferred embodiment of the present invention employs the calibration sequence of Platzker et al, incorporated by reference, described in column 10, lines 50 through 66, as implemented in the DFC product.

With alignment and calibration completed, the innovation of the present invention may be performed. The transmit-and-receive sites A, B and C when operating in Transmit mode will produce a "capture update stream" which may be sent to remote sites over a communication link [25] and/or stored locally [26]. This stream consists of Local Updates that represent periodic changes as Markings are being written (and erased) by the user(s). Receiver mode receives capture update streams from one or more remote sites or as played back from storage, merges the information, and displays it as the local Computer Display Image. Receiver mode requires no special devices other than the computer. At any given time the user(s) may choose to "commit" the Writing Surface Writings so as to freeze and save the Committed Image that represents all participating Writing Surfaces for the current "page" into some suitable medium, such as storage component [26], transmission channel [25], or to a compatible software application.

Modules Comprising the Steps of the Preferred Embodiment

An implementation of the preferred embodiment includes software with the following components, although variations in the design are possible without departing from the spirit of the invention. The flowchart in FIG. 3 shows these modules and how they are interrelated:

a. Capture Engine [31]—Controls the operation of the software modules that track, analyze and report changes to the Writing Surface. It manages the timing of the processing and the flow of data between modules.

b. Real-time Detector [32]—Analyzes Viewed Images at a rapid rate to detect events in the visual field. Specifically, the module contains an "interference detector" which determines if and where Viewed Image Interference appears in the image, a "changes detector" which determines if and where Markings appear to have changed (written and/or erased) and a "projection cancellation" unit which determines if and where relevant Projections that appear in the Viewed Image have changed so that they may be discarded. By comparing the results of these units this module can determine which changes in the Viewed Image represent actual, Local Markings (Writings and Erasures).

c. Capture Processor [33]—When Local Markings have occurred, this module performs image processing of the modified data. Various techniques are employed to clean-up the image, enhance its appearance for visualization and to transform it geometrically to a predetermined coordinate space (Warping). The result is an update to the local Writing Image.

d. Capture Codec [34]—This module encodes updates to the local Writing Image in a compressed format as Local Updates for transmission and/or storage (Transmit mode) and decodes incoming Remote Updates from remote sites or from a playback source (Receive mode). Outgoing Local Updates may also undergo splitting into partial Local Updates so as to meet bandwidth limitations that may be imposed externally. This module also provides services of merging and displaying images that combine the Writing Images from the different participating Writing Surfaces including scaling the image geometry to match the target computer display resolution as necessary.

Receive mode typically requires only the Capture Codec module [34] while Transmit mode requires the other modules in addition. An alternative mode of operation allows the Transmitting station to send streams of Local Updates that can be viewed by existing Internet browsers without requiring any special-purpose components, such as Capture Codec. The following describes the operational flow of the process modeled in FIG. 3 in greater detail.

Description of Image Processing

This section describes the inputs and outputs of the image process and the internal operation of each of its modules in the preferred embodiment of the invention as depicted in FIG. 3.

Inputs and Outputs:

The inputs of a transmitter site include up to two continuous streams of information—Viewed Images [301] and updates being made to the Computer Display Images [302]. The former stream [301] contains the Markings that will be extracted, processed and transmitted. The optional latter stream [302] is required so that the system may distinguish between changes to physical Local Markings and changes to Projections if the configuration includes a projector [24]. If the Computer Display Image is not projected onto the Writing Surface [21], this stream is not required (as depicted by the dashed lines in FIG. 3). Otherwise, it can preferably be produced by trapping events that cause the display to be updated or by periodically obtaining an internal representation of the Computer Display Image. In either case, modern computer operating systems provide the services, such as callable Microsoft Windows® functions, required for producing this information. In addition, calibration information [303], described above, is also used by a transmitter site.

A transmitter produces as output a stream of Local Updates [304]. These Local Updates are data packets [304] that encode successive changes to Local Markings; i.e. the Writing and Erasures that takes place on the local Writing Surface. Typically, each packet encodes a "delta," describing the net change to the Writing Surface. When it is advantageous, other types of packets may be used. For example, when a large amount of Erasures is detected it may be preferable to produce a full encoding of the Writing Surface or when it is determined that the Writing Surface has been completely cleared a concise "clear" packet may be used.

Receiver stations accept Remote Update packets produced by transmitters [305] where each packet is labeled with the identification of the originating transmitter. There are generally two local outputs from a typical receiver. One output is a composite image that merges the representations of all participating Writing Images for the purposes of storing a Committed Image [306]. A second output from a receiver is a composite image that merges all remote Writing Images, and excludes the local Writing Image, if present, for the purposes of producing a new Computer Display Image [302]. In some applications, such as when projection is used [24] it may be useful to include the Background Image [307] (e.g., containing a spreadsheet, text, diagrams, pictures etc.) when producing either of these composite images. Composite images are created by merging any number of input images (Writing Images and optional Background Image) using a procedure that adheres to the following rules:

- A pixel that is part of the Writings in none of the input images will not be "written" in the composite image (i.e. it is assigned the background color, typically white).
- A pixel that is part of the Writings in one or more input images will be assigned a non-background color. The choice of color depends on the color(s) of that pixel in the input images and is determined by a "merging algorithm."

The "merging algorithm" used by the present invention takes a "layered" approach whereby the input images are is seen as (arbitrarily) ordered, overlapping layers. The output color chosen is the color of the pixel in the topmost "layer" (input image) in which the pixel was "written." An alternative approach would be to compute a new color for the output pixel by blending the colors of the overlapping input pixels. Various formulae may be employed for such blending and are known from the literature. In any case, the "merging algorithm" typically applies to a relatively small portion of the pixels since the participants will not typically overlap much of their Writings.

The current invention may be used for various applications other than interactive remote sessions. For example, the outgoing (or incoming) stream(s) of Local Updates could be recorded into storage [26] (possibly accompanied by other streams of data such as "raw" video and audio) for later playback of a session. In this case a single site may operate independently as a transmitter (during recording) or receiver (during playback) without taking Remote Update streams [305]. This independence of transmit and receive modes is emphasized by the dashed lines in the lower part of FIG. 3.

Capture Engine [131]

The Capture Engine module [31] manages the flow of data and processing control between the various modules of a transmitter system. As shown in FIG. 3, it is a high-level component that controls the operation of the Real-time Detector [32] and Capture Processor [33] sub-modules.

The Capture Engine [31] executes a repeating cycle of operations. In each cycle, it grabs a current Viewed Image [301] and also a synchronized and geometrically adjusted Computer Display Image (if projection is employed) [302] as described below. The input images are passed to the Real-time Detector module [32], which determines what relevant changes, if any have occurred since the last cycle. Subsequently, the Capture Engine [31] may decide to invoke the Capture Processor module [33]. The criteria for this decision include: whether the Real-time Detector has found relevant changes, the time that has elapsed since the prior Local Update (as compared to a predefined interval giving the desired update-rate), the size of the detected change and the current processing load of the computer. If the Capture Processor [33] module is invoked, it produces an update that is passed to the Capture Codec module [34] for encoding and transmission.

After completing the cycle described above, the Capture Engine [31] schedules the execution of the next cycle. It determines an interval during which processing is suspended before beginning the following cycle. The criteria for determining this interval include: whether or not an update was produced in this cycle, the rate of detection most suitable for tracking changes and the processing load of the computer. Intervals will vary among implementations, but they typically range from tens to hundreds of milliseconds in-between successive processing cycles.

As described above, the Computer Display Image used as input [302] (if projection is employed) should be "synchronized" with the Viewed Image input. This means that both images together simultaneously represent the appearance of the Writing Surface at a specific time. A counter example would occur if the Computer Display Image contained changes that did not yet appear in the Viewed Image or vice versa. Synchronization is required to avoid erroneous results. For example, if a newly projected object appears in the Viewed Image but the system uses an outdated Computer Display Image that does not contain this object, the system could erroneously determine that this object is a new Local Marking.

Synchronizing the input streams to the desired degree of accuracy can be accomplished using several approaches. In the preferred embodiment of the invention events that cause changes to the computer display are trapped, and a queue of updates is maintained along with timing information. This enables the system to sample the Computer Display Image, as it appeared when the Viewed Image was sampled. If strict synchronization cannot be implemented, the Capture Engine [31] can avoid processing when there is a risk of unsynchronized occurrences, for example by skipping cycles when the operating-system or the Capture Codec (in receiver mode) [34] indicate that the computer display is undergoing change.

Computer display information must also undergo Warping and "scaling"—operations that transform the geometry of the Computer Display Image to match that of the Viewed Image so that they can be compared with each other. Such transformation are well known in the art and can be accomplished with high accuracy, for example by utilizing bilinear interpolation, given the aforementioned calibration information and system parameters.

Real-time Detector [32]

The Real-time Detector [32] is responsible for tracking the information contained in the input streams (Viewed Images and optionally, the Computer Display Images) to determine, in real-time, if and where relevant changes have occurred to the Writing Surface [21]. When such change, (Writings and Erasures) do occur, it updates internal image and state information to reflect the detected change. Upon each execution of the Real-time Detector [32], it updates this state information while performing temporal integration to improve quality and reduce noise. It outputs a subset of this information that describes the currently detected change. This consists of one or more image masks indicating which areas have changed and data from the Viewed Image that corresponding to those area.

The Real-time Detector [32] may be implemented as a series of three main detection units:

1. Change Detector

This unit detects changes in the Viewed Image that are potentially new Markings, but may also be caused by changes to the Projections (if any) or Viewed Image Interference. The unit distinguishes between Local Writings and Local Erasures in order to use different processing techniques optimized for each type of change. Image noise is also eliminated, for example by applying criteria of signal strength and size or shape constraints. In addition, results of prior cycles are used in order to track the process of writing or erasing as it takes place.

The change detector is implemented using a combination of various approaches that are based on well-known image processing techniques. Processing phases include: comparing the Viewed Image input to the current state information, including a Stored Viewed Image, to produce a difference image which is then binarized to determine the areas in which significant changes have occurred, using edge-detection filters in order to detect lines that represent new Writings or Erasures in those areas, gray-scale comparison operations to the known reference image or Stored Viewed Images to verify and isolate the change, filtering of noise and other artifacts that are not actual lines and "stability checks" that remove transient image artifacts by verifying that each change appears in two or more consecutive cycles.

2. Interference Detector

This unit identifies image areas that contain Viewed Image Interference such as a writer's body or clothing or other ephemeral objects introduced into the field-of-view. These areas are masked-off from the areas in which changes were detected in this cycle. An interference detector also employs a combination of standard image-processing techniques. It compares the Viewed Image to the calibration reference image. The difference image obtained from this comparison is binarized after histogram analysis to determine an optimal binarization threshold. Morphological operations are used to smooth the result and close "holes" that appear in it. Low frequency components are assumed to be Viewed Image Interference. Transient changes are also assumed to be Viewed Image Interference and these are detected by "stability checks" that compare the current Viewed Image to the Viewed Image of the previous processing cycle. Additional clues to the existence of Viewed Image Interference are obtained in areas in which Writings seem to disappear (yet an Erasure is not detected) and in areas in which Projections change appearance in the Viewed Image without a corresponding change to the Computer Display Image. Additional accuracy may be obtained by employing feature extraction and pattern recognition techniques to identify certain, common shapes of expected obstructions such as a user's torso or hand. Processing color information can be useful in distinguishing skin or clothing. In addition, conclusions from prior cycles may be used in order to track motion of interfering objects.

3. Projection Cancellation (when Projection is Employed)

The purpose of this unit is to eliminate extraneous information from the Viewed Image when such information results from projection of the Computer Display Image. Such Projections may include both a "fixed" (seldom-changing) Background Image as well as Remote Updates that are continuously being received from remote stations, if any such stations are participating. The object is to leave only Writings and Erasures made on the physically local Writing Surface in the update undergoing processing. The motivation for projection cancellation is thus twofold:

It prevents the unnecessary transmission of projected background information that is part of the "page" being displayed by the computer. This information is already available in digital form within the computer and should not be handled as if it were Markings on the Writing Surface.

It prevents transmission "echoes." This means that each station transmits only information that was created locally without bouncing back projected Remote Updates received from remote stations.

The implementation is based on analysis of updates to the Computer Display Image [302] and matching changes to it with changes to the Viewed Image [301]. Wherever a matching change is found in both, it is "subtracted" or discarded. This leaves only the changes that represent physical updates to the Writing Surface [21] or an empty set when no actual changes were made. The subtraction is done in a careful manner that avoids, to the extent possible, the discarding of Markings that happen to overlap Projections (for example, when a writer draws a line through a projected word). When overlap does occur, it is usually the case that Markings are made over existing Projections or vice versa (rather than simultaneous appearance of both types of information). By comparing the Viewed Image to the Stored Viewed Image the new Markings can be distinguished from preexisting Projections and the areas of overlap can be processed to appear similar and continuous to the neighboring non-overlapping areas.

The order of execution and precise division of responsibility between detection units may vary in alternate embodiments of the invention. In fact, they may even be programmed using multiple, interdependent processing stages since the conclusions of each unit may assist the others in producing accurate results. For example, the "interference detector" may take advantage of clues produced by the "change detector" and "projection cancellation" units. Specifically, areas detected as possible Erasures and areas in which the appearance of Projections is distorted relative to their expected appearance may indicate the presence of Viewed Image Interference. Conversely, the "change detector" and "projection cancellation" units could perform more accurately if they were supplied information about the location of Viewed Image Interference in the Viewed Image as provided by the "interference detector."

Capture Processor [33]

The Capture Processor [33] is responsible for transforming the Image Sensor data of changed Markings into aesthetically pleasing Writing Image data suitable for merging with other Writing Images and/or the Background Image. Specifically, background areas that have no Writings should be colored white or some other predetermined or "transparent" background color. When applicable, Warping of the processed Markings should be performed to compensate for geometric distortions (see below). Markings should be readable, well formed and should reproduce the same approximate color as that of the marker used. Improving readability and form is accomplished by performing visualization enhancements, which include "stretching" the gray-scale intensities and smoothing the Markings using anti-aliasing techniques. Reproducing the marker color is achieved by performing "color normalization" and "color quantification." The former utilizes information from the calibration reference image as well as the Computer Display Image [302] (if projected) to overcome color distortions due to background lighting. Color quantifying assigns discrete hues to each given Marking, thereby reducing the number of colors in use. This serves to make the resulting updates more accurate, readable and compact. Additional operations may be performed such as vectorization and potentially, optical character recognition or other shape or pattern recognition operations. These may be intended to further improve the quality of the Markings for rendering, printing or other uses as well as to reduce the amount of data required so as to improve compression. These steps utilize techniques that are based on extensive literature in the fields of graphics, image processing and pattern-recognition.

When Warping is possible (calibration information supplies it), the Capture Processor [33] Warps Markings in order to compensate for geometric distortions of the Viewed Image due to the perspective or optics of the Image Sensor device. This produces a straight, undistorted image in a predetermined coordinate space which, preferably, is common to all participating sites. An important result of Warping is that it brings images from each remote site to the same geometry (or possibly differing only by a scaling factor if a common coordinate space is not enforced). This allows the images to be matched and merged as done in subsequent processing. Markings processed in this way, if projected, would accurately overlay the physical Writings that produced them.

Capture Codec [34]

The Capture Codec module [34] encodes local changes to Markings into compact packets (Local Updates) that may be appended to a data stream undergoing transmission to other sites and/or to storage media [304]. It also decodes such packets if they arrive from remote sites (Remote Updates) or if they are played back from storage [305]. Internal representations of the local Writing Surface [21], if any, and of remote Writing Surface [21] if any, are maintained for the encoding and decoding operations. These are referred to as Writing Images. A merged, composite image of any subset of the participating Writing Images may be obtained from this module [306] as described earlier. Various considerations affect the implementation of the encoding and decoding algorithms used by the Capture Codec [34] One consideration is the data format(s) used to encode the image information. The choice depends, among other things, on the characteristics of the data, degree of compression obtainable and the amount of processing time required. The current invention utilizes the Microsoft RLE8 (8-bit Run Length Encoding) format for encoding. This provides the advantages of a "standard" format and a reasonable degree of compression. Special codes could be employed to further improve the degree of compression. Given that the input data represents a stream of updates, each update may be encoded as a "delta" which specifies what information has changed in the respective cycle rather than an encoding the full representation of the Writing Image every time. As stated above, other types of packets are conceivable and are employed when advantageous and appropriate. Certain applications require that a full-image encoding be periodically output as a "key frame", for example to allow a viewer to join in mid-session or for skipping to different positions when playing back a recorded session.

Another consideration involves constraints on the output bandwidth (size of data produced per unit time). When bandwidth limitations are imposed, any Local Update [304] may be split such that part of it is output (up to the maximum allowed bandwidth) and part is buffered to be output later. To further optimize use of the allowed bandwidth, buffered Local Updates [304] are modified by subsequently produced Local Updates [304]. This implies that Local Updates [304] for an area of the Writing Surface [21] that undergoes rapid successive changes may cancel each other out and reduce the overall output size (as a trade-off for the delay in buffering). For example, when an area that has just been erased is immediately overwritten (or vice versa), rather than producing two separate and conflicting Local Updates [304], only the net result will be output, thus reducing the amount of bandwidth used.

Additional sophistication may be introduced into the Capture Codec [34] processing. Sub-units of the content of each packet may be prioritized for transmission based on various criteria so that "important" information arrives first, while less important updates are postponed as long as necessary. Using another approach, an entire Local Update [304] can be transmitted, at first with poor quality but high compression (e.g., by sub-sampling to a lower resolution) and then gradually supplementing the transmission with the missing information that improves quality. The motivation for such "progressive encoding" is to ensure that the Local Update is transmitted, albeit with loss of quality, even if limited bandwidth is available. In this case, new Local Updates [304] may take priority over enhancing the quality of prior Local Updates [304], the latter being postponed until no new Local Updates [304] occur and bandwidth becomes available.

Detailed Examples

A detailed example of an image processing and display scenario is presented in FIGS. 4A, 4B and 5. The diagrams of FIGS. 4A and 4B show successive "snapshots" in time of the appearance of the Writing Surfaces [21] at three remote sites: transmit-and-receive sites A, B and C, and receive-only sites D and E. Sites A, B and C have their composite images projected upon their respective Writing Surfaces [21A, 21B and 21C]. These snapshot representations of the appearance of these Writing Surfaces [21] follow a time line which progresses diagrammatically in vertical columns down the page.

For purposes of illustration, assume site [21A] A's Writing Surface is a large such as a standard, erasable whiteboard; at site B, a small surface such as a piece of paper; and at site C, a conventional flipchart. As depicted in FIG. 1, the displays at sites D and E are a projector [24D] and computer monitor [12], respectively, passively displaying the composite images of FIG. 4B.

In the first illustration [41A], the writer at site A has drawn a picture of a fish on the local Writing Surface, upon which is projected the title "Fish Anatomy" (from the Background Image) throughout the session. After a brief interval, the drawing of the fish appears at the other sites. [41C, 41D, 41E] (the appearance of the Writing Surface [21B] at site B is identical, but not represented). The writer at site B then annotates the projection of the fish drawing [42B] and these Writings are soon visible at the other sites [42C, 42D, 42E] (the appearance of the Writing Surface [21A] at site A is identical, but not represented).

At this point, the writer at site A overwrites these projected Markings to correct the error made by the other writer at site B [43A]. Again, after a brief interval, the written correction made at site A appears in the Computer Display Images at Sites B,C, D and E [43B, 43D] (the appearance of the Writing Surface [21C] at site C and the display [12] at site E are identical, but not represented). Subsequently, the writer at site C adds Writings as shown in [44C] and these appear at all other sites [44E] (all other surfaces and displays appear identical, but are not represented). Thereafter, the writer at site B erases the incorrect Markings (Local Erasure of the arrow) and replaces these with new, correct Markings (Local Writings of a different arrow) [45B]. These changes at site B produce Local Updates, which appear at the other sites [45C, 45D, 45E] (the appearance of the Writing Surface [21A] at site A is not represented). The process by which this particular Local Update [304] is produced is graphically depicted in FIG. 5 as explained in further detail later.

Throughout the ongoing session, transient Viewed Image Interference (physical obstructions such as a hand or body) in the way of the images being captured are detected as non-informational and discarded prior to transmission to the other sites and/or storage. The result is a continuous display at all five sites devoid of such distractions in their respective Computer Display Images.

Finally, the writer at site A erases the prior Markings (site A Local Erasure) and makes new Markings in their place (site A Local Writings) [46A]. Soon thereafter at all five sites A, B, C, D and E, a replica appears of the same composite image of the final result of this session of projections, Writings and Erasures at sites A, B and C. At site A, the Writing Surface [21A] contains the writer's physical Markings interposed upon the projected Computer Display Image [302] containing Remote Updates [305] from sites B and C. Conversely, at site B, the Writing Surface [21B] contains the site B writer's physical Markings, also interposed upon a projected Computer Display Image, [302] but this Computer Display Image displays the Remote Updates [305] deriving from sites A and C. At site C, the Writing Surface [21C] contains the site C writer's physical Markings, interposed upon a projected Computer Display Image [302], which, in this case, displays the Remote Updates [305] deriving from sites A and B. As receive-only sites, D and E did not participate in the alteration of the image; the Computer Display Image [302] at these sites is a composite of sites A, B and C.

Consequently, all five sites display what, in effect, are representations of the same result, although the images actually differ in two important respects: (a) the transmit-and-receive sites' viewers see a combination of physical Markings and projections over them, whereas the receive-only sites view a display alone (i.e., no physical Markings); and (b) the scale and appearance of the images appearing may differ between the sites due to differences in the size of the Writing/Projection Surfaces [21] and/or resolution capabilities of their respective computer-driven display devices.

While the specific elements in each site's Computer Display Image [302] will vary according to where the Local Markings appear, and the resolution and size of the display may vary, viewers will nevertheless subjectively perceive that they are seeing the "same" image, regardless of which site they are at. Objectively, when at any time users at any site elect to create a Committed Image [306], the process of the present invention will create a Committed Image [306] that will be identical at every site, except for adjustments to accommodate differences in resolution and size of display.

By way of further explanation of the transformations depicted above, FIG. 5 illustrates the process in additional detail. Referring now to FIG. 5, there are depicted the processing steps and images used during a typical cycle of the software components shown in FIG. 3 that run on the computer of site B ([23B] in FIGS. 1 and 2A). Remote Updates [305A] and [305C] arrive from sites A and C, respectively, via the communications network [25B]. Remote Updates [305A] and [305C] are used by the Capture Codec [34] to construct internal representations of the physical Markings at each of these sites shown as Remote Writing Images [511] and [512], respectively. These remote images are merged within the Capture Codec [34] to form a Composite Remote Writing Image [521]. If a computer generated Background Image [307] is also employed, it too is merged with the former to create a composite Computer Display Image [302], which is projected onto the Writing Surface [21B] by the projector [24B]. At this point the visual scene contains, in addition to these Projections, Viewed Image Interference and the recently modified physical Markings on the local Writing Surface [21B] as shown in [532] and [533] respectively. The Image Sensor device [22B] views the scene and provides a Viewed Image [301] containing a digital representation of this scene including all the aforementioned visual elements—Projections, Viewed Image Interference and Markings. Due to the nature of the Image Sensor and its positioning, the Viewed Image contains both geometric distortion and limited optical quality and is degraded by noise and other known imaging artifacts. The Viewed Image [301] is input into the Capture Engine [31] along with the calibration Reference Image [303] and the Computer Display Image [302]. Assuming that the Viewed Image [301] and Computer Display Image [302] are properly synchronized (i.e. the former is up-to-date with respect to the latter) the Real-time Detector [32] analyzes the images along with the Stored Viewed Image [542] and other stored information not depicted in the figure, to determine which content, if any, should be processed as changes to Local Markings. It detects and ignores both the Viewed Image Interference and Projections apparent in the Viewed Image leaving only changes to the Markings on the Writing Surface [21]. The Capture Processor [33] proceeds to clean-up, geometrically Warp and properly color the changed pixels, thereby updating an internal Writing Image [551] with its results. Finally, the Capture Codec [34] compares the newly updated Writing Image [551] with the previously Stored Writing Image [552] to determine precisely which pixels have been written and/or erased since the last cycle of processing. The result of this comparison is then encoded for transmission via the communications network [25B] and/or for saving to storage [26B] as a new outgoing Local Update [304], which is depicted in the figure as a full image for the sake of clarity.

While the preferred and alternate embodiments of the invention have been depicted herein in detail, modifications and adaptations may be made thereto, without departing from the spirit and scope of the invention as delineated in the following claims.

What is claimed is:

1. An apparatus for providing a portion of a composite image on a first surface to a second surface remote from said first surface, said apparatus including:
   (a) an image sensor for providing a first signal indicative of images on said first surface;
   (b) a first computer for receiving said first signal and responsive to a first stored signal to provide a differential signal;
   (c) a second computer for receiving said differential signal and responsive to a second stored signal to provide a second signal; and
   (d) a device for receiving said second signal to provide said composite image to said second surface.

2. The apparatus of claim 1, wherein said first computer includes an executable program in which said first signal is compared to said stored signal to provide said differential signal which is filtered to exclude signals indicative of interfering objects present in said first signal.

3. The apparatus of claim 2 in which said executable program further processes said first signal, said first signal having a succession of frames, examining said succession of frames for variations in said differential signal, thereby identifying said interfering objects present in said first signal.

4. The apparatus of claim 1, wherein said composite image comprises background information and markings and wherein the differential signal is filtered to exclude a background signal from the composite image.

5. The apparatus of claim 4, wherein said background signal is a projected signal, said apparatus further comprising a second device for providing said projected signal onto said first surface.

6. The apparatus of claim 5, wherein the projected signal changes periodically.

7. The apparatus of claim 5, wherein the projected signal changes frequently and is indicative of markings from additional remote surfaces.

8. The apparatus of claim 1, further comprising a storage medium for storing said composite image, said composite image comprising images from said first and second surfaces at a given time.

9. The apparatus of claim 1, further comprising a transmission interface for transmitting said composite image, said composite image comprising images from said first and second surfaces at a given time.

10. The apparatus of claim 7, further comprising a storage medium for storing said composite image, said composite image comprising images from said first, second and additional remote surfaces at a given time.

11. The apparatus of claim 7, further comprising a transmission interface for transmitting said composite image, said composite image comprising images from said first, second and additional remote surfaces at a given time.

12. An apparatus as in claim 1, wherein said second surface is a display screen.

13. An apparatus as in claim 1, wherein said first and second stored signals are the same signal.

14. A method of providing a signal indicative of markings made on a surface in a viewing field, which signal is not indicative of the presence of interfering objects should they be present in said viewing field, comprising the steps:
   a. providing a signal indicative of said viewing field, said signal being composed of sequential frames of said viewing field;
   b. detecting changes between successive ones of said frames of said viewing field to provide a series of changed viewing field signals;
   c. filtering said series of said changed viewing field signals to exclude signals indicative of interfering objects to provide a series of filtered, changed viewing field signals;
   d. detecting changes between successive ones of said series of filtered, changed viewing field signals to provide said signal indicative of markings made on said surface.

15. The method of claim 14, further providing a storage medium for storing at least one of said series of said filtered, changed viewing field signals.

16. The method of claim 14, further providing a transmission interface for transmitting at least one of said series of said filtered, changed viewing field signals.

17. The method of claim 14, wherein said viewing field comprises background information and wherein said method further comprises the step of filtering said signal indicative of said viewing field to exclude said background information.

18. An apparatus for providing a marked image onto a second surface, said marked image corresponding to markings on a first surface, said first surface having a complete image thereon comprising background information and said markings, said apparatus, comprising:

an image sensing circuit for capturing said complete image to provide a complete image signal;

a device responsive to a differential signal for providing said marked image onto said second surface; and a unit for receiving said complete image signal and responsive to a background signal for providing said differential signal.

19. An apparatus as in claim 18 wherein said second surface is a display screen.

20. An apparatus as in claim 18 wherein said first and second stored signals are the same signal.

* * * * *